(12) United States Patent
Nobukuni

(10) Patent No.: US 12,479,241 B2
(45) Date of Patent: Nov. 25, 2025

(54) TIRE

(71) Applicant: Sumitomo Rubber Industries, Ltd., Kobe (JP)

(72) Inventor: Shingo Nobukuni, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 66 days.

(21) Appl. No.: 18/436,063

(22) Filed: Feb. 8, 2024

(65) Prior Publication Data

US 2024/0308275 A1 Sep. 19, 2024

(30) Foreign Application Priority Data

Mar. 13, 2023 (JP) .................................. 2023-038910

(51) Int. Cl.
*B60C 11/01* (2006.01)
*B60C 11/03* (2006.01)

(52) U.S. Cl.
CPC ......... *B60C 11/01* (2013.01); *B60C 2011/013* (2013.01); *B60C 2011/0358* (2013.01)

(58) Field of Classification Search
CPC ... B60C 11/01; B60C 11/032; B60C 11/0306; B60C 2011/0358; B60C 2011/013
See application file for complete search history.

(56) References Cited

U.S. PATENT DOCUMENTS

| | | | | |
|---|---|---|---|---|
| 4,977,942 A | * | 12/1990 | Ochiai | B60C 11/01 152/209.16 |
| 2021/0387477 A1 | * | 12/2021 | Tamura | B60C 11/01 |
| 2022/0009294 A1 | * | 1/2022 | Yao | B60C 15/06 |

FOREIGN PATENT DOCUMENTS

| | | | | |
|---|---|---|---|---|
| JP | 2001163007 A | * | 6/2001 | ............... B60C 9/12 |
| JP | 2006-182180 A | | 7/2006 | |
| JP | 2014-088116 A | | 5/2014 | |
| JP | 2018-083506 A | | 5/2018 | |
| JP | 2018-111360 A | | 7/2018 | |

OTHER PUBLICATIONS

Extended European search report issued on Jul. 30, 2024, in corresponding European patent Application No. 24162159.8, 7 pages.

* cited by examiner

*Primary Examiner* — Cedrick S Williams
(74) *Attorney, Agent, or Firm* — XSENSUS LLP

(57) ABSTRACT

A tire can include a tread portion and a buttress portion. The tread portion can include a crown region between a tire equator and a middle position and a shoulder region between a first tread ground-contact end and the middle position. The buttress portion can have a land ratio which is a land portion ratio between the first tread ground-contact end and a first position. A land ratio of the shoulder region can be larger than a land ratio of the crown region and the land ratio of the buttress portion.

19 Claims, 5 Drawing Sheets

TIRE

CROSS-REFERENCE TO RELATED APPLICATION(S)

The present application claims priority to Japanese Patent App. No. 2023-038910 filed Mar. 13, 2023, wherein the entire content and disclosure of which is incorporated herein by reference.

BACKGROUND

The present disclosure relates to a tire.

BACKGROUND ART

Japanese Laid-Open Patent Publication No. 2018-083506 describes a pneumatic tire including a tread portion provided with a pair of shoulder main grooves and a plurality of shoulder lateral grooves extending from the respective shoulder main grooves. In the pneumatic tire of the foregoing patent document, a land ratio of each shoulder region is described as being increased by making the maximum groove width of the shoulder lateral grooves to be 0.2 to 0.6 times the maximum groove width of the shoulder main grooves, thereby improving noise performance.

In recent years, in line with the growing interest in environmental issues, improvement of noise performance, especially, further reduction of exterior noise, has been desired or even required. As a method for reducing exterior noise, increasing the land ratio of the tread portion may deteriorate mud performance, which may be regarded as running performance on muddy terrain.

SUMMARY

According to an aspect, a tire can include: a tread portion having a first tread ground-contact end; and a buttress portion extending outward in a tire axial direction from the first tread ground-contact end, wherein the tread portion includes a middle position in the tire axial direction between the first tread ground-contact end and a tire equator, a crown region between the tire equator and the middle position, and a shoulder region between the first tread ground-contact end and the middle position, the buttress portion has a first land ratio which is a land portion ratio between the first tread ground-contact end and a first position separated from an outer end in a tire radial direction of the tread portion inward in the tire radial direction by a distance which is 23% of a tire cross-sectional height, and a second land ratio of the shoulder region is larger than a third land ratio of the crown region and the first land ratio of the buttress portion.

DETAILED DESCRIPTION

Figure 1:
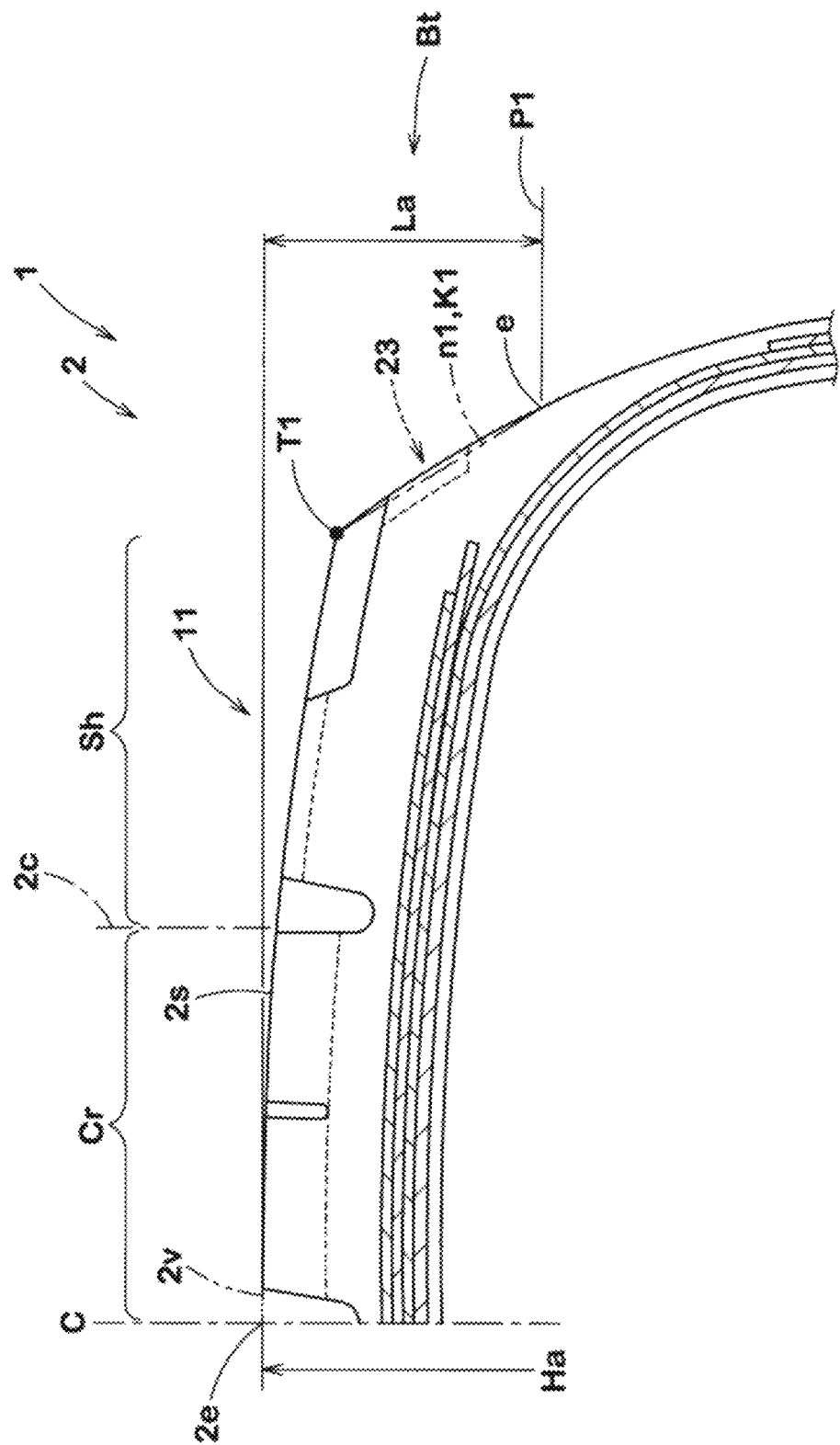
FIG. 1 is a tire meridian cross-sectional view showing a part of a tire according to one or more embodiments of the present disclosure in an enlarged manner.

Hereinafter, one or more embodiments of the present disclosure will be described with reference to the drawings. The drawings may contain exaggerated expressions and expressions that differ from the dimensional ratio of the actual structure in order to help the understanding of the one or more embodiments of the present disclosure. In addition, when there are a plurality of embodiments, the same or common elements may be denoted by the same reference characters throughout the description, and the redundant description thereof is omitted.

One or more embodiments of the present disclosure have been made in view of the above circumstances, and an object of the present of one or more embodiments of the present disclosure, among one or more objects, can be to provide a tire that can reduce exterior noise while suppressing deterioration of mud performance.

As a result of employing configurations based on the description herein, the tire according to one or more embodiments of the present disclosure can reduce exterior noise while suppressing deterioration of mud performance.

Figure 2:
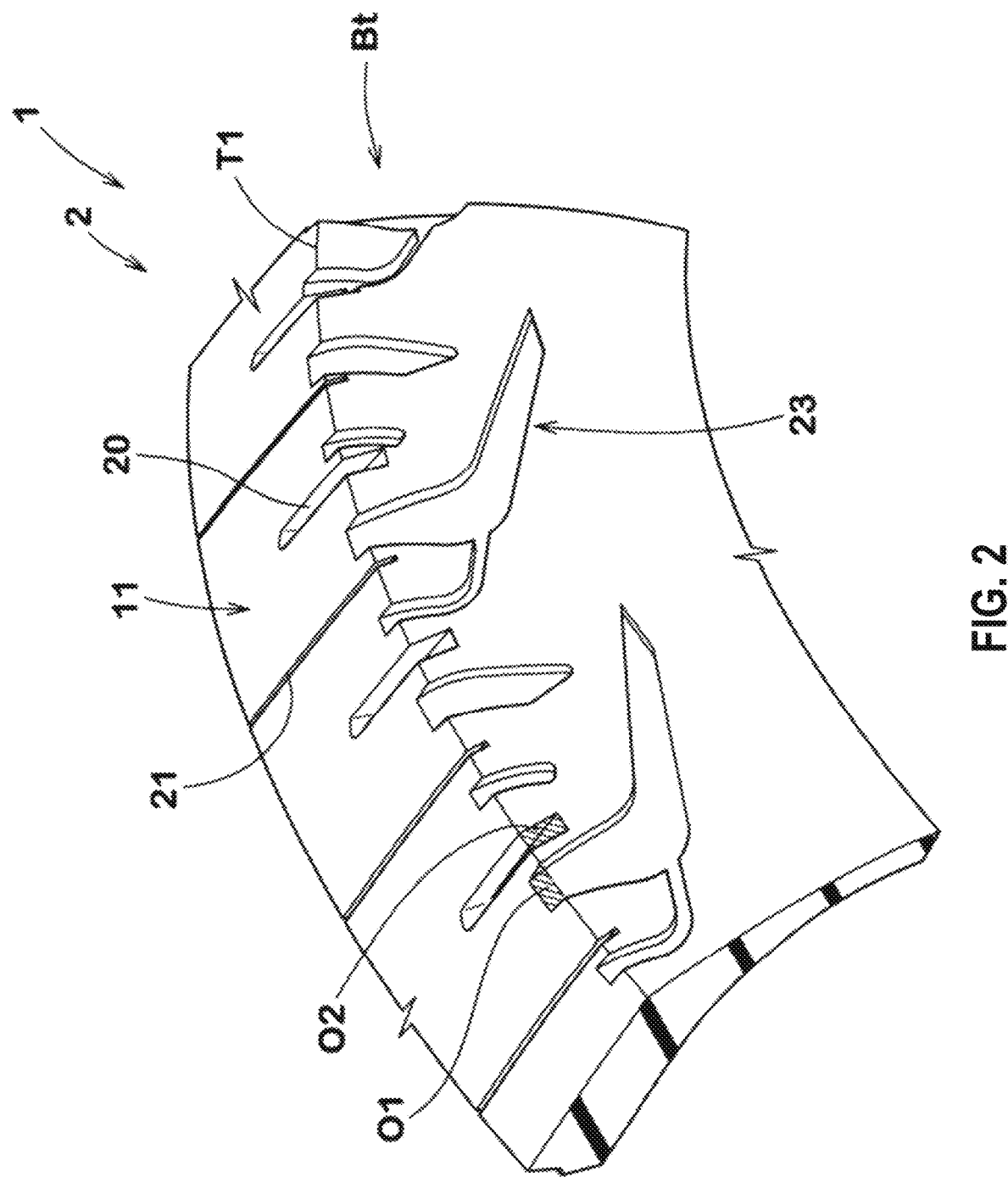
FIG. 2 is a cross-sectional perspective view of the tire in FIG. 1.

FIG. 1 is a partially enlarged view of a tire meridian cross-section, of a tire 1 according to one or more embodiments of the present disclosure, including a tire rotation axis. FIG. 2 is a partial perspective cross-sectional view of the tire 1 in FIG. 1. The tire 1 according to one or more embodiments of the present disclosure can be suitably used, for example, as a pneumatic tire for a passenger car, specifically, as a tire for a four-wheel-drive vehicle capable of running on muddy terrain. However, one or more embodiments of the present disclosure are not so limited and may be used, for example, for a heavy duty pneumatic tire, and even for a non-pneumatic tire the interior of which is not filled with pressurized air.

In the present specification, unless otherwise specified, dimensions and the like of components of the tire 1 can be values measured in a standardized state. In the case of a pneumatic tire for which various standards are defined, the "standardized state" can be regarded as a state where the tire is fitted on a standardized rim and inflated to a standardized internal pressure and no load is applied to the tire. In the case of a tire for which various standards are not defined, the standardized state can mean a standard use state, corresponding to the purpose of use of the tire, where the tire is not mounted on a vehicle and no load is applied to the tire.

The "standardized rim" can be regarded as a rim that is defined, in a standard system including a standard on which the tire is based, by the standard for each tire, and can be, for example, the "standard rim" in the JATMA standard, the "Design Rim" in the TRA standard, or the "Measuring Rim" in the ETRTO standard.

The "standardized internal pressure" can be regarded as an air pressure that is defined, in a standard system including a standard on which the tire is based, by the standard for each tire, and can be the "maximum air pressure" in the JATMA standard, the maximum value indicated in the table "TIRE LOAD LIMITS AT VARIOUS COLD INFLATION PRESSURES" in the TRA standard, or the "INFLATION PRESSURE" in the ETRTO standard, as examples.

As shown in FIG. 1 and FIG. 2, the tire 1 can include a tread portion 2 and a buttress portion Bt. The tread portion 2 can have a first tread ground-contact end T1. The buttress portion Bt can extend outward in the tire axial direction from the first tread ground-contact end T1.

The tread portion 2 can include a middle position 2c in the tire axial direction between the first tread ground-contact end T1 and a tire equator C, a crown region Cr between the tire equator C and the middle position 2c, and a shoulder region Sh between the first tread ground-contact end T1 and the middle position 2c. During tire running, the shoulder region Sh can be regarded as a region from which noise due to vibration and air column resonance is likely to leak to the outside of the tire 1 and which can contribute to exterior noise. Meanwhile, the crown region Cr which is located away from the first tread ground-contact end T1 and the buttress portion Bt which extends outward in the tire axial direction from the first tread ground-contact end T1 can contribute relatively little to exterior noise.

The buttress portion Bt can have a land ratio D which can be a land portion ratio between the first tread ground-contact end T1 and a first position P1 separated from an outer end 2e in the tire radial direction of the tread portion 2 inward in the tire radial direction by a distance La which is 23% of a tire cross-sectional height Ha. A land ratio B of the shoulder region Sh can be larger than a land ratio A of the crown region Cr and the land ratio D of the buttress portion Bt. Accordingly, the noise leaking from the shoulder region Sh to the outside of the tire 1 can be reduced. Meanwhile, in the crown region Cr and the buttress portion Bt, a shearing force on mud by grooves provided in the crown region Cr and the buttress portion Bt (hereinafter, simply referred to as "shearing force") can be exerted. Therefore, the tire 1 according to one or more embodiments of the present disclosure can reduce exterior noise while suppressing deterioration of mud performance. A reason why the first position P1 is adopted for the land ratio D can be that the first position P1 can be the inner end in the tire radial direction of a region that can have a large opportunity to come into contact with mud during running on muddy terrain regardless of the size of the tire 1 (region where a shearing force is exerted). The outer end 2e can be the position at which a tread surface 2s of the tread portion 2 and the tire equator C intersect each other. In the case where a groove (groove 11 described later) is provided on the tire equator C, the outer end 2e can be the position at which the tire equator C and a virtual tread surface 2v obtained by filling the groove intersect each other. The tire cross-sectional height Ha can be the distance in the tire radial direction between a bead base line and the outer end 2e. The bead base line can be a line extending in the tire axial direction and passing through the rim diameter position of the standardized rim.

The land ratio A and the land ratio B can each be specified as a ratio (K/Ka) of a surface area K of a tread surface in the region Cr or Sh to a surface area Ka of a virtual tread surface obtained by filling all grooves 11 in the region Cr or Sh. The land ratio B can be specified as a ratio obtained on the assumption that an opening O1 at the first tread ground-contact end T1 of each buttress lateral groove 23 provided on the buttress portion Bt is not present. The land ratio D can be specified by the following equation (1) using a virtual surface K1 and a total K2 of opening areas of buttress lateral grooves 23 connected to the first tread ground-contact end T1. The land ratio D can be specified as a ratio obtained on the assumption that an opening O2 at the first tread ground-contact end T1 of each groove 11 provided on the tread portion 2 is not present.

$$D = (K1 - K2)/K1 \quad (1)$$

The virtual surface K1 can be an annular surface formed by connecting the first tread ground-contact end T1 and a first point e, on the outer surface of the buttress portion Bt, which is on the outermost side in the tire axial direction at the first position P1, by a straight line n10. The "opening area" can be the area on the virtual surface K1 of the buttress lateral groove 23.

The land ratio B (%) of the shoulder region Sh can be larger than the land ratio D (%) of the buttress portion Bt, for instance, by preferably 20 points or more and further preferably 30 points or more, and by preferably 50 points or less and further preferably 40 points or less. Since the difference (B-D) in land ratio can be 20 points or more, the land ratio B of the shoulder region Sh can be made moderately larger, so that exterior noise can be reduced. In addition, since the difference (B-D) in land ratio can be 50 points or less, an excessive decrease in the stiffness of the buttress portion Bt can be suppressed, so that a shearing force on mud can be exerted.

The crown region Cr can be a region that may generate pitch sound or air column resonance sound and that contributes more to exterior noise than the buttress portion Bt. Therefore, it may be desirable to further reduce exterior noise by making the land ratio A of the crown region Cr larger than the land ratio D of the buttress portion Bt.

In order to effectively exhibit the above-described effects, according to one or more embodiments of the present disclosure, the land ratio B of the shoulder region Sh can be preferably not less than 70% and further preferably not less than 75%, and can be preferably not greater than 90% and further preferably not greater than 85%. In addition, according to one or more embodiments of the present disclosure, the land ratio A of the crown region Cr can be preferably not less than 50% and further preferably not less than 55%, and can be preferably not greater than 70% and further preferably not greater than 65%. Furthermore, according to one or more embodiments of the present disclosure, the land ratio D of the buttress portion Bt can be preferably not less than 30% and further preferably not less than 35%, and can be preferably not greater than 50% and further preferably not greater than 45%.

Figure 3:
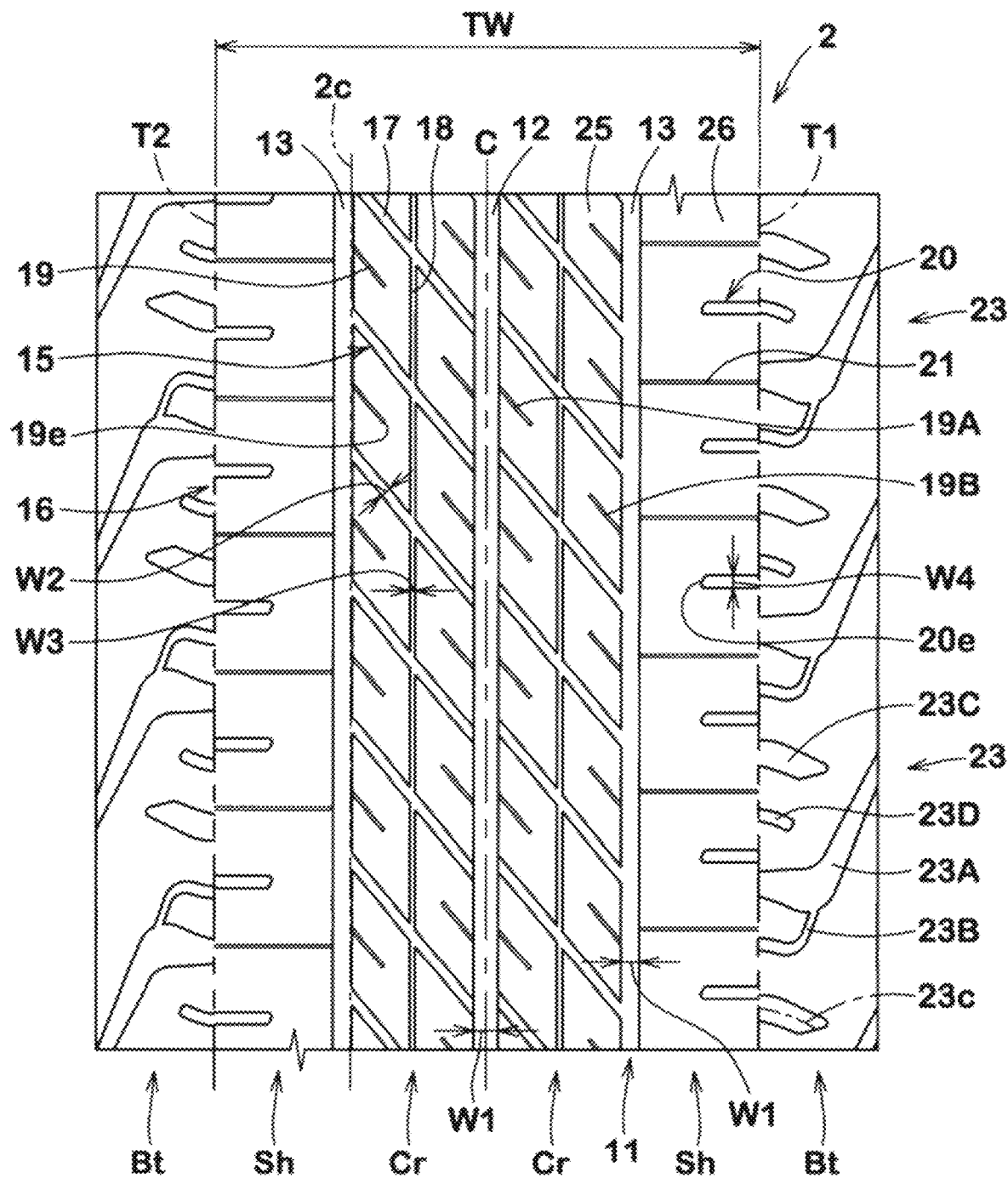
FIG. 3 is a plan view of a tread portion and a buttress portion developed in a flat surface according to one or more embodiments of the present disclosure.
Figure 5:
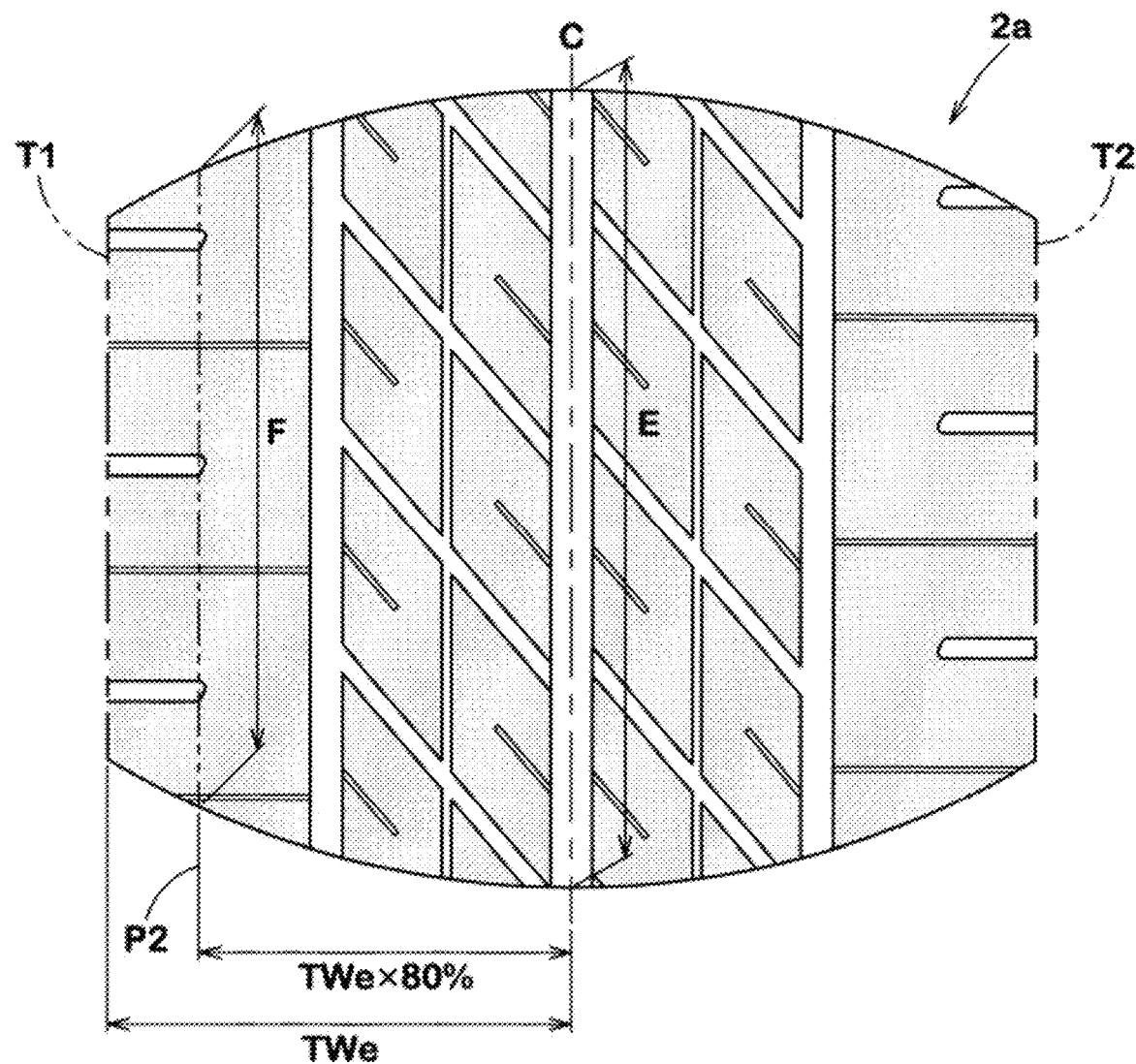
FIG. 5 is a plan view showing a ground-contact surface shape of the tread portion according to one or more embodiments of the present disclosure.

FIG. 3 is a plan view of the tread portion 2 and the buttress portion Bt according to one or more embodiments of the present disclosure, developed or presented in a flat surface. As shown in FIG. 3, the tread portion 2 can further have a second tread ground-contact end T2. The first tread ground-contact end T1 and the second tread ground-contact end T2 can both ve ends in the tire axial direction of a ground-contact surface 2a (e.g., as shown in FIG. 5) in a standardized load-applied state. The "standardized load-applied state" can be regarded as a state where the tire 1 is fitted on the standardized rim with the standardized internal pressure and is brought into contact with a flat surface at a camber angle of 0° with 80% of a load represented by a load index (LI) being applied to the tire 1.

In the present specification, the load index (LI) can be, for example, an index that is defined by the JATMA standard and can represent a maximum mass allowed to be applied to a tire under a specified condition, that is, a maximum load capacity, as an index number.

The tread portion 2 can include a plurality of grooves 11. According to one or more embodiments, the plurality of grooves 11 can include a crown circumferential groove 12 extending on the tire equator C, and a plurality of (e.g., a pair) shoulder circumferential grooves 13 provided on both sides of the tire equator C. According to one or more embodiments, the pair of shoulder circumferential grooves 13 can be located in the shoulder regions Sh. In addition, according to one or more embodiments of the present disclosure, the tread portion 2 can have a pattern that is point-symmetric with respect to any point on the tire equator C. Therefore, in the present specification, the description of the tread portion 2 between the tire equator C and the first tread ground-contact end T1 can also serve as a description of the tread portion 2 between the tire equator C and the second tread ground-contact end T2. The tread portion 2 may not be limited to such a mode, and may have a pattern that is line-symmetric with respect to the tire equator C, or may have an asymmetric pattern.

According to one or more embodiments of the present disclosure, the crown circumferential groove 12 and the shoulder circumferential groove 13 can extend in a straight manner and can be parallel to the tire circumferential direction. Each of groove widths W1 of the crown circumferential groove 12 and the shoulder circumferential groove 13 can be preferably not less than 2% and further preferably not less than 3% of a tread width TW, and can be preferably not greater than 7% and further preferably not greater than 6% of the tread width TW, as examples. However, the crown circumferential groove 12 and the shoulder circumferential groove 13 may not be limited to such a mode. The tread width TW can be the separation distance in the tire axial direction between the first tread ground-contact end T1 and the second tread ground-contact end T2.

The tread portion 2 according to one or more embodiments of the present disclosure can include a crown land portion 25 located between the crown circumferential groove 12 and the shoulder circumferential groove 13, and a shoulder land portion 26 located between the shoulder circumferential groove 13 and the first tread ground-contact end T1.

The plurality of grooves 11 can also include, for example, crown grooves 15 provided on the crown land portion 25, and shoulder grooves 16 provided on the shoulder land portion 26. The crown grooves 15 can include a plurality of crown lateral grooves 17 traversing the crown land portion 25, crown longitudinal grooves 18 connecting the crown lateral grooves 17 adjacent to each other in the tire circumferential direction, and crown sub-lateral grooves 19 each having an end portion 19e terminating within the crown land portion 25 at one end thereof. The shoulder grooves 16 can include, for example, a plurality of shoulder lateral grooves 20 connected to the first tread ground-contact end T1. In the present embodiment, the shoulder grooves 16 can also include shoulder sub-lateral grooves 21 connecting the first tread ground-contact end T1 and the shoulder circumferential groove 13. In the present specification, the term "sub-lateral groove" can refer to a groove with a groove width of less than 2 mm in the form of a cutout, and can be distinguished from lateral grooves, longitudinal grooves, and circumferential grooves having a groove width of 2 mm or more.

According to one or more embodiments, each crown lateral groove 17 can be inclined with respect to the tire axial direction. A groove width W2 of the crown lateral groove 17 can be, for example, 20% to 60% of the groove width W1 of the crown circumferential groove 12. According to one or more embodiments, each crown longitudinal groove 18 can be located at the middle in the tire axial direction of the crown land portion 25 and can extend parallel to the tire circumferential direction. A groove width W3 of the crown longitudinal groove 18 can be, for example, 10% to 30% of the groove width W1 of the crown circumferential groove 12. According to one or more embodiments, each crown sub-lateral groove 19 can be provided between the crown lateral grooves 17 adjacent to each other in the tire circumferential direction and can extend parallel to the crown lateral grooves 17. The crown sub-lateral grooves 19 can include, for example, first crown sub-lateral grooves 19A connected to the crown circumferential groove 12, and second crown sub-lateral grooves 19B connected to the shoulder circumferential groove 13.

According to one or more embodiments, each shoulder lateral groove 20 can have an end portion 20e terminating within the shoulder land portion 26 and extends parallel to the tire axial direction. The end portion 20e of the shoulder lateral groove 20 can be located, for example, at the middle in the tire axial direction of the shoulder land portion 26. A groove width W4 of the shoulder lateral groove 20 can be preferably 20% to 60% of the groove width W1 of the crown circumferential groove 12, as an example range. According to one or more embodiments, each shoulder sub-lateral groove 21 can be provided between the shoulder lateral grooves 20 adjacent to each other in the tire circumferential direction and can extend parallel to the shoulder lateral grooves 20.

A total Ja of edge components in the tire axial direction of the grooves 11 provided in the crown region Cr among the plurality of grooves 11 can be preferably not less than 30% and further preferably not less than 35% of a total Jb of edge components in the tire axial direction of the grooves 11 provided in the shoulder region Sh among the plurality of grooves 11, and can be preferably not greater than 50% and further preferably not greater than 45% of the total Jb. Since the total Ja may be not less than 30% of the total Jb, a scratching force on mud in the crown region Cr can be maintained, for instance, so that deterioration of mud performance is suppressed. Since the total Ja may be not greater than 50% of the total Jb, the stiffness in the tire circumferential direction of the crown region Cr can be maintained, for instance, so that stable running on muddy terrain can be achieved.

A total Sa of edge components in the tire circumferential direction of the grooves 11 provided in the crown region Cr among the plurality of grooves 11 can be preferably not less than 300% and further preferably not less than 350% of a total Sb of edge components in the tire circumferential direction of the grooves 11 provided in the shoulder region Sh among the plurality of grooves 11, and can be preferably not greater than 500% and further preferably not greater than 450% of the total Sb. Since the total Sa may be not less than 300% of the total Sb, a scratching force on mud in the crown region Cr can be enhanced during cornering, for instance, so that operability on a muddy road can be improved. Since the total Sa may be not greater than 500% of the total Sb, the stiffness in the tire axial direction of the crown region Cr can be maintained.

Figure 4:
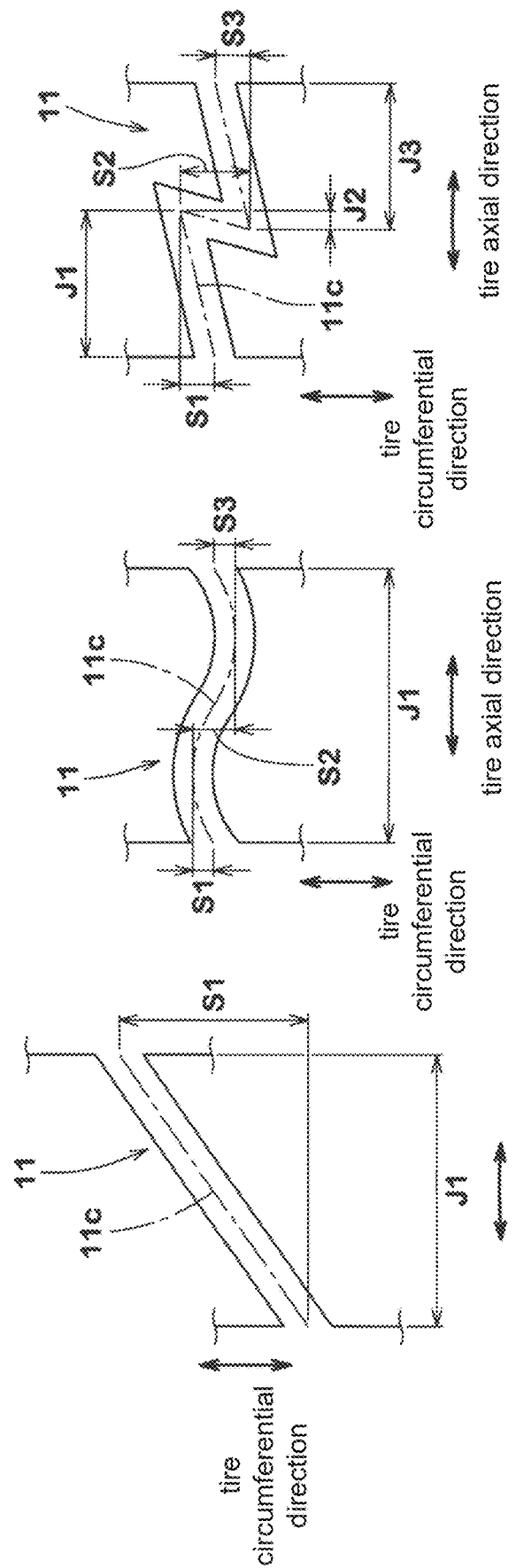
FIG. 4A to FIG. 4C are each a plan view for describing an edge component in the tire circumferential direction and an edge component in the tire axial direction of a groove according to one or more embodiments of the present disclosure.

FIG. 4A to FIG. 4C are each a plan view for describing specification of an edge component J in the tire axial direction and an edge component S in the tire circumferential direction of each groove 11. FIG. 4A shows a groove 11 extending in a straight manner, FIG. 4B shows a groove 11 extending in a wavy manner, and FIG. 4C shows a groove 11 extending in a zigzag manner. As shown in FIG. 4A to FIG. 4C, each edge component of each groove 11 is specified by a groove center line 11c of the groove 11. In the groove 11 shown in FIG. 4A, the edge component J in the tire axial direction is J1, and the edge component S in the tire circumferential direction is S1. In the groove 11 shown in FIG. 4A, the edge component J in the tire axial direction is J1, and the edge component S in the tire circumferential direction is S1+S2+S3. In the groove 11 shown in FIG. 4C, the edge component J in the tire axial direction is J1+J2+J3, and the edge component S in the tire circumferential direction is S1+S2+S3. According to one or more embodiments, the edge components J in the tire axial direction of the crown circumferential groove 12 and the shoulder circumferential groove 13 can each be "0 (zero)". In addition, according to one or more embodiments, the edge components S in the tire circumferential direction of the shoulder lateral grooves 20 and the shoulder sub-lateral grooves 21 can each be "0 (zero)".

As shown in FIG. 3, the buttress portion Bt can include a plurality of buttress lateral grooves 23 connected to the first tread ground-contact end T1. The plurality of buttress lateral grooves 23 can include, for example, a plurality of first buttress lateral grooves 23A, a plurality of second buttress lateral grooves 23B, a plurality of third buttress lateral grooves 23C, and a plurality of fourth buttress lateral grooves 23D. Each first buttress lateral groove 23A can have a largest maximum groove width among the buttress lateral grooves 23, and can extend so as to be bent. Each second buttress lateral groove 23B can be bent in the same direction as the first buttress lateral groove 23A and can be connected to the first buttress lateral groove 23A. Each third buttress lateral groove 23C can be formed with an edge component in the tire radial direction smaller than that of the first buttress lateral groove 23A. Each fourth buttress lateral groove 23D can be formed with an edge component in the tire radial direction smaller than that of the third buttress lateral groove 23C.

In the plurality of buttress lateral grooves 23, a total R of edge components in the tire radial direction can be preferably not less than 1000% and further preferably not less than 1100% of a total Sx of edge components in the tire circumferential direction, and can be preferably not greater than 2000% and further preferably not greater than 1900% of the total Sx. Since the total R may be not less than 1000% of the total Sx, the shearing force can be increased. Since the total R may be not greater than 2000% of the total Sx, an excessive decrease in the stiffness of the buttress portion Bt can be suppressed. The edge component in the tire radial direction and the edge component in the tire circumferential direction of each buttress lateral groove 23 can each be specified by a groove center line 23c of the buttress lateral groove 23 as in each groove 11.

According to one or more embodiments, less than half of the plurality of shoulder lateral grooves 20 can be connected to any of the plurality of buttress lateral grooves 23. In other words, half or more of the plurality of shoulder lateral grooves 20 may not be connected to any of the plurality of buttress lateral grooves 23. Accordingly, noise passing through the shoulder lateral grooves 20 can be inhibited from being discharged to the outside of the tire 1 through the buttress lateral grooves 23. In addition, since half or more of the plurality of shoulder lateral grooves 20 may not be connected to any of the plurality of buttress lateral grooves 23, the frequency of the noise passing through the respective lateral grooves 20 and 23 can be dispersed. Therefore, exterior noise can be further reduced.

FIG. 5 is a plan view of the ground-contact surface 2a in the standardized load-applied state. As shown in FIG. 5, in the ground-contact surface 2a of one or more embodiments of the present disclosure, a ratio (F/E) of a ground-contact length F in the tire circumferential direction at a second position P2 to a ground-contact length E in the tire circumferential direction on the tire equator C can be preferably not less than 0.7 and further preferably not less than 0.75, and can be preferably not greater than 0.9 and further preferably not greater than 0.85. Since the ratio (F/E) may be not less than 0.7, slipping at the shoulder region Sh during running can be suppressed, for instance, so that occurrence of noise due to slipping can be reduced. Since the ratio (F/E) may not be greater than 0.9, a shearing force can be exerted in the crown region Cr including the tire equator C rather than in the shoulder region Sh, for instance, so that mud performance can be improved. The second position P2 can be a position separated from the tire equator C outward in the tire axial direction by 80% of a length TWe in the tire axial direction between the first tread ground-contact end T1 and the tire equator C. In addition, each ground-contact length E or F can be or have a length obtained by filling the grooves 11 of the tread portion 2.

The tire 1 having the shape of the ground-contact surface 2a as shown in FIG. 5 can be produced, for example, by changing the thickness of a tread rubber of a structure to be provided in the tread portion 2 and a tire component of the structure such as a carcass to be provided inside the tread portion 2.

Embodiments of the present disclosure are not limited to the above specific embodiments, and various modifications can be made to implement a tire according to the present disclosure.

EXAMPLES

Tires having the basic pattern in FIG. 3 were produced as test tires on the basis of specifications in Table 1. Each test tire was tested for mud performance and noise performance. The specifications common to the respective test tires and test methods are as follows. In each example, the basic pattern was the same, and the land ratio was varied by changing the groove widths of the grooves.

Tire size: 195/80R16
Internal pressure (kPa): 230 (all wheels)
<Mud Performance>

The respective test tires were mounted on all wheels of the following test vehicle. A test driver drove this vehicle on a muddy test course. The test driver made sensory evaluation for running characteristics regarding steering responsiveness, shearing force, grip, etc., at this time. The results are indicated as scores with the result of Comparative Example 1 being regarded as 100. The higher the value is, the better the mud performance is.

Test vehicle: four-wheel-drive passenger car having an engine displacement of 660 cc
<Noise Performance>

Exterior noise was evaluated through sensory evaluation by a tester when the test vehicle was driven on a dry road surface. The results are indicated as scores with the exterior noise of Comparative Example 1 being regarded as 100. A higher value indicates that the exterior noise is lower and that the noise performance is better.

Speed: 70 km/h
The test results are shown in Table 1.

TABLE 1

|  | Comp. Ex. 1 | Ex. 1 | Ex. 2 | Ex. 3 | Ex. 4 |
|---|---|---|---|---|---|
| Land ratio A (%) | 60 | 60 | 50 | 60 | 60 |
| Land ratio B (%) | 60 | 80 | 80 | 90 | 70 |
| Land ratio D (%) | 60 | 40 | 50 | 30 | 50 |
| Mud performance [Score: higher value is better] | 100 | 100 | 102 | 102 | 98 |
| Noise performance [Score: higher value is better] | 100 | 110 | 105 | 105 | 105 |

As a result of the test, the tire of each Example can reduce exterior noise while suppressing deterioration of mud performance.

Additional Notes

The present disclosure can include some or all of the following aspects.

Present Disclosure 1

A tire including:
a tread portion having a first tread ground-contact end; and
a buttress portion extending outward in a tire axial direction from the first tread ground-contact end, wherein
the tread portion includes a middle position in the tire axial direction between the first tread ground-contact end and a tire equator, a crown region between the tire equator and the middle position, and a shoulder region between the first tread ground-contact end and the middle position,
the buttress portion has a land ratio which is a land portion ratio between the first tread ground-contact end and a first position separated from an outer end in a tire radial direction of the tread portion inward in the tire radial direction by a distance which is 23% of a tire cross-sectional height, and
a land ratio of the shoulder region is larger than a land ratio of the crown region and the land ratio of the buttress portion.

Present Disclosure 2

The tire according to Present Disclosure 1, wherein the land ratio of the crown region is larger than the land ratio of the buttress portion.

Present Disclosure 3

The tire according to Present Disclosure 1 or 2, wherein the land ratio (%) of the shoulder region is larger than the land ratio (%) of the buttress portion by 20 to 50 points.

Present Disclosure 4

The tire according to any one of Present Disclosures 1 to 3, wherein
the land ratio of the shoulder region is 70% to 90%,
the land ratio of the crown region is 50% to 70%, and
the land ratio of the buttress portion is 30% to 50%.

Present Disclosure 5

The tire according to any one of Present Disclosures 1 to 4, wherein
in a ground-contact surface in a standardized load-applied state where the tire is fitted on a standardized rim with a standardized internal pressure and is brought into contact with a flat surface at a camber angle of 0° with 80% of a load represented by a load index being applied to the tire,
a ratio (F/E) of a ground-contact length F in a tire circumferential direction at a second position separated from the tire equator outward in the tire axial direction by 80% of a length in the tire axial direction between the first tread ground-contact end and the tire equator, to a ground-contact length E in the tire circumferential direction on the tire equator, is 0.7 to 0.9.

Present Disclosure 6

The tire according to any one of Present Disclosures 1 to 5, wherein
the tread portion includes a plurality of grooves,
the plurality of grooves include a plurality of shoulder lateral grooves connected to the first tread ground-contact end,
the buttress portion includes a plurality of buttress lateral grooves connected to the first tread ground-contact end, and
less than half of the plurality of shoulder lateral grooves are connected to any of the plurality of buttress lateral grooves.

Present Disclosure 7

The tire according to any one of Present Disclosures 1 to 6, wherein a total of edge components in the tire axial direction of grooves provided in the crown region among the plurality of grooves is 30% to 50% of a total of edge components in the tire axial direction of grooves provided in the shoulder region among the plurality of grooves.

Present Disclosure 8

The tire according to any one of Present Disclosures 1 to 7, wherein a total of edge components in the tire circumferential direction of the grooves provided in the crown region among the plurality of grooves is 300% to 500% of a total of edge components in the tire circumferential direction of the grooves provided in the shoulder region among the plurality of grooves.

Present Disclosure 9

The tire according to any one of Present Disclosures 1 to 8, wherein, in the plurality of buttress lateral grooves, a total of edge components in the tire radial direction is 1000% to 2000% of a total of edge components in the tire circumferential direction.

Present Disclosure 10

The tire according to any one of Present Disclosures 1 to 9, wherein the plurality of buttress lateral grooves include:
a plurality of first buttress lateral grooves,
a plurality of second buttress lateral grooves different in configuration from the first buttress lateral grooves,
a plurality of third buttress lateral grooves different in configuration from the first buttress lateral grooves and the second buttress lateral grooves, and a plurality of fourth buttress lateral grooves different in configuration from the first buttress lateral grooves, the second buttress lateral grooves, and the third buttress lateral grooves.

Present Disclosure 11

The tire according to any one of Present Disclosures 1 to 10,
wherein each of the first buttress lateral grooves is connected to a corresponding one of the second buttress lateral grooves,
wherein none of the third buttress lateral grooves connect to any other of the plurality of buttress lateral grooves, and
wherein none of the fourth buttress lateral grooves connect to any other of the plurality of buttress lateral grooves.

Present Disclosure 12

The tire according to any one of Present Disclosures 1 to 11, wherein each of the first, second, third, and fourth buttress lateral grooves begins at the first tread ground contact end and extend at least partially outward in the tire axial direction.

Present Disclosure 13

The tire according to any one of Present Disclosures 1 to 12, wherein the tread portion is a shoulder land portion and includes the plurality of shoulder lateral grooves, each of the shoulder lateral grooves having an end portion terminating within the shoulder land portion.

Present Disclosure 14

The tire according to any one of Present Disclosures 1 to 13, wherein each of the plurality of shoulder lateral grooves extends parallel to the tire axial direction.

What is claimed is:
1. A tire comprising:
a tread portion having a first tread ground-contact end; and
a buttress portion extending outward in a tire axial direction from the first tread ground-contact end, wherein
the tread portion includes:
a middle position in the tire axial direction between the first tread ground-contact end and a tire equator,
a crown region between the tire equator and the middle position, and
a shoulder region between the first tread ground-contact end and the middle position,
the buttress portion has a first land ratio which is a land portion ratio between the first tread ground-contact end and a first position separated from an outer end in a tire radial direction of the tread portion inward in the tire radial direction by a distance which is 23% of a tire cross-sectional height Ha,
a second land ratio of the shoulder region is larger than a third land ratio of the crown region and the first land ratio of the buttress portion,
the tread portion includes a plurality of grooves,
the plurality of grooves include a plurality of shoulder lateral grooves connected to the first tread ground-contact end,
the buttress portion includes a plurality of buttress lateral grooves connected to the first tread ground-contact end,
less than half of the plurality of shoulder lateral grooves are connected to any of the plurality of buttress lateral grooves, and
one or more of the following:
a total of edge components in the tire axial direction of grooves provided in the crown region among the plurality of grooves is 30% to 50% of a total of edge components in the tire axial direction of grooves provided in the shoulder region among the plurality of grooves,
a total of edge components in a tire circumferential direction of grooves provided in the crown region among the plurality of grooves is 300% to 500% of a total of edge components in the tire circumferential direction of grooves provided in the shoulder region among the plurality of grooves, and/or
in the plurality of buttress lateral grooves, a total of edge components in the tire radial direction is 1000% to 2000% of a total of edge components in the tire circumferential direction.

2. The tire according to claim 1, wherein the third land ratio of the crown region is larger than the first land ratio of the buttress portion.

3. The tire according to claim 1, wherein the second land ratio of the shoulder region is larger than the first land ratio of the buttress portion by 20 to 50 points.

4. A tire comprising:
a tread portion having a first tread ground-contact end; and
a buttress portion extending outward in a tire axial direction from the first tread ground-contact end, wherein
the tread portion includes:
a middle position in the tire axial direction between the first tread ground-contact end and a tire equator,
a crown region between the tire equator and the middle position, and
a shoulder region between the first tread ground-contact end and the middle position,
the buttress portion has a first land ratio which is a land portion ratio between the first tread ground-contact end and a first position separated from an outer end in a tire radial direction of the tread portion inward in the tire radial direction by a distance which is 23% of a tire cross-sectional height Ha,
a second land ratio of the shoulder region is larger than a third land ratio of the crown region and the first land ratio of the buttress portion,
the tread portion includes a plurality of grooves,
the plurality of grooves include a plurality of shoulder lateral grooves connected to the first tread ground-contact end,
the buttress portion includes a plurality of buttress lateral grooves connected to the first tread ground-contact end,
less than half of the plurality of shoulder lateral grooves are connected to any of the plurality of buttress lateral grooves, and
the plurality of buttress lateral grooves include:
a plurality of first buttress lateral grooves,
a plurality of second buttress lateral grooves different in configuration from the first buttress lateral grooves,
a plurality of third buttress lateral grooves different in configuration from the first buttress lateral grooves and the second buttress lateral grooves, and a plurality of fourth buttress lateral grooves different in configuration from the first buttress lateral grooves, the second buttress lateral grooves, and the third buttress lateral grooves.

5. The tire according to claim 4, wherein
each of the first buttress lateral grooves is connected to a corresponding one of the second buttress lateral grooves,
none of the third buttress lateral grooves connect to any other of the plurality of buttress lateral grooves, and
none of the fourth buttress lateral grooves connect to any other of the plurality of buttress lateral grooves.

6. The tire according to claim 4, wherein
each of a first, second, third, and fourth buttress lateral grooves begins at the first tread ground contact end and extend at least partially outward in the tire axial direction, and
the tread portion is a shoulder land portion and includes the plurality of shoulder lateral grooves, each of the shoulder lateral grooves having an end portion terminating within the shoulder land portion.

7. The tire according to claim 4, wherein
the third land ratio of the crown region is larger than the first land ratio of the buttress portion, and
the second land ratio of the shoulder region is larger than the first land ratio of the buttress portion by 20 to 50 points.

8. A tire comprising:
a tread portion having a first tread ground-contact end; and
a buttress portion extending outward in a tire axial direction from the first tread ground-contact end, wherein
the tread portion includes:
a middle position in the tire axial direction between the first tread ground-contact end and a tire equator,
a crown region between the tire equator and the middle position, and
a shoulder region between the first tread ground-contact end and the middle position,
the buttress portion has a first land ratio which is a land portion ratio between the first tread ground-contact end and a first position separated from an outer end in a tire radial direction of the tread portion inward in the tire radial direction by a distance which is 23% of a tire cross-sectional height Ha,
a second land ratio of the shoulder region is larger than a third land ratio of the crown region and the first land ratio of the buttress portion,
in a ground-contact surface in a standardized load-applied state where the tire is fitted on a standardized rim with a standardized internal pressure and is brought into contact with a flat surface at a camber angle of 0° with 80% of a load represented by a load index being applied to the tire, and
a ratio (F/E) of a ground-contact length F in a tire circumferential direction at a second position separated from the tire equator outward in the tire axial direction by 80% of a length in the tire axial direction between the first tread ground-contact end and the tire equator, to a ground-contact length E in the tire circumferential direction on the tire equator, is 0.7 to 0.9.

9. The tire according to claim 1, wherein the third land ratio of the crown region is larger than the first land ratio of the buttress portion.

10. The tire according to claim 1, wherein the second land ratio of the shoulder region is larger than the first land ratio of the buttress portion by 20 to 50 points.

11. The tire according to claim 1, wherein
the tread portion includes a plurality of grooves,
the plurality of grooves include a plurality of shoulder lateral grooves connected to the first tread ground-contact end,
the buttress portion includes a plurality of buttress lateral grooves connected to the first tread ground-contact end, and
less than half of the plurality of shoulder lateral grooves are connected to any of the plurality of buttress lateral grooves.

12. The tire according to claim 11, wherein a total of edge components in the tire axial direction of grooves provided in the crown region among the plurality of grooves is 30% to 50% of a total of edge components in the tire axial direction of grooves provided in the shoulder region among the plurality of grooves.

13. The tire according to claim 11, wherein a total of edge components in a tire circumferential direction of grooves provided in the crown region among the plurality of grooves is 300% to 500% of a total of edge components in the tire circumferential direction of grooves provided in the shoulder region among the plurality of grooves.

14. The tire according to claim 11, wherein, in the plurality of buttress lateral grooves, a total of edge components in the tire radial direction is 1000% to 2000% of a total of edge components in a tire circumferential direction.

15. The tire according to claim 11, wherein the plurality of buttress lateral grooves include:
a plurality of first buttress lateral grooves,
a plurality of second buttress lateral grooves different in configuration from the first buttress lateral grooves,
a plurality of third buttress lateral grooves different in configuration from the first buttress lateral grooves and the second buttress lateral grooves, and
a plurality of fourth buttress lateral grooves different in configuration from the first buttress lateral grooves, the second buttress lateral grooves, and the third buttress lateral grooves.

16. The tire according to claim 11,
wherein each of the first buttress lateral grooves is connected to a corresponding one of the second buttress lateral grooves,
wherein none of the third buttress lateral grooves connect to any other of the plurality of buttress lateral grooves, and
wherein none of the fourth buttress lateral grooves connect to any other of the plurality of buttress lateral grooves.

17. The tire according to claim 11, wherein each of a first, second, third, and fourth buttress lateral grooves begins at the first tread ground contact end and extend at least partially outward in the tire axial direction.

18. The tire according to claim 11, wherein the tread portion is a shoulder land portion and includes the plurality of shoulder lateral grooves, each of the shoulder lateral grooves having an end portion terminating within the shoulder land portion.

19. The tire according to claim 18, wherein each of the plurality of shoulder lateral grooves extends parallel to the tire axial direction.

* * * * *